(12) United States Patent
Tao et al.

(10) Patent No.: US 10,142,851 B2
(45) Date of Patent: Nov. 27, 2018

(54) SPECTRUM PROCESSING METHOD, BASE STATION, USER EQUIPMENT, AND SYSTEM

(71) Applicant: Huawei Technologies Co., Ltd., Shenzhen (CN)

(72) Inventors: Xuetao Tao, Shanghai (CN); Yuan Gao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 71 days.

(21) Appl. No.: 15/247,579

(22) Filed: Aug. 25, 2016

(65) Prior Publication Data
US 2016/0366593 A1 Dec. 15, 2016

Related U.S. Application Data

(63) Continuation of application No. PCT/CN2014/072526, filed on Feb. 25, 2014.

(51) Int. Cl.
*H04W 16/14* (2009.01)
*H04L 5/00* (2006.01)
(Continued)

(52) U.S. Cl.
CPC ........... *H04W 16/14* (2013.01); *H04L 5/0057* (2013.01); *H04W 24/10* (2013.01);
(Continued)

(58) Field of Classification Search
CPC .... H04L 5/0057; H04W 16/14; H04W 24/10; H04W 72/0453; H04W 88/06; H04W 88/08
See application file for complete search history.

(56) References Cited

U.S. PATENT DOCUMENTS 9,294,310 B2 * 3/2016 Wu ................... H04B 7/0689
2010/0202305 A1 8/2010 Wijting et al.
(Continued)

FOREIGN PATENT DOCUMENTS

CN 101690291 A 3/2010
CN 101836384 A 9/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, V12.0.0, pp. 1-186, $3^{rd}$ Generation Partnership Project, Valbonne, France (Dec. 2013).

*Primary Examiner* — Liton Miah
(74) *Attorney, Agent, or Firm* — Leydig, Voit & Mayer, Ltd.

(57) ABSTRACT

Embodiments of the present invention relate to the field of communications technologies and disclose a spectrum processing method, a base station, user equipment, and a system. The method includes: receiving, by a base station corresponding to a first cell, at least one subband channel quality parameter that is sent by user equipment (UE) in the first cell, where each subband channel quality parameter indicates quality of one subband channel; and determining, according to the at least one subband channel quality parameter, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell. Embodiments of the present invention are mainly applied to a process of using a network spectrum.

12 Claims, 7 Drawing Sheets

A base station corresponding to a first cell receives at least one subband channel quality parameter that is sent by user equipment UE in the first cell, where each subband channel quality parameter indicates quality of one subband channel — 101

Determine, according to the at least one subband channel quality parameter, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell — 102

(51) Int. Cl.
  *H04W 24/10* (2009.01)
  *H04W 72/04* (2009.01)
  *H04W 88/06* (2009.01)
  *H04W 88/08* (2009.01)

(52) U.S. Cl.
  CPC ........ H04W 72/0453 (2013.01); *H04W 88/06* (2013.01); *H04W 88/08* (2013.01)

(56) References Cited

U.S. PATENT DOCUMENTS

| | | | |
|---|---|---|---|
| 2011/0250919 A1* | 10/2011 | Barbieri | H04L 1/0026 455/509 |
| 2011/0310741 A1* | 12/2011 | Ko | H04W 84/12 370/235 |
| 2013/0121272 A1 | 5/2013 | Barbieri et al. | |
| 2013/0155973 A1* | 6/2013 | Geirhofer | H04W 72/1231 370/329 |
| 2013/0273931 A1* | 10/2013 | Lunttila | H04W 24/10 455/452.2 |
| 2013/0301450 A1* | 11/2013 | Geirhofer | H04B 7/024 370/252 |
| 2014/0301333 A1* | 10/2014 | Takahashi | H04B 7/024 370/329 |
| 2015/0208263 A1* | 7/2015 | Behravan | H04B 7/024 370/252 |
| 2017/0078056 A1 | 3/2017 | Sankar et al. | |

FOREIGN PATENT DOCUMENTS

| | | |
|---|---|---|
| CN | 101933301 A | 12/2010 |
| CN | 102711122 A | 10/2012 |
| CN | 102843697 A | 12/2012 |
| CN | 103222295 A | 7/2013 |
| EP | 2916574 A1 | 9/2015 |
| WO | WO 2008096997 A2 | 8/2008 |
| WO | WO 2010124729 A1 | 11/2010 |

* cited by examiner

SPECTRUM PROCESSING METHOD, BASE STATION, USER EQUIPMENT, AND SYSTEM

CROSS-REFERENCE TO RELATED APPLICATIONS

This application is a continuation of International Application No. PCT/CN2014/072526, filed on Feb. 25, 2014, which is hereby incorporated by reference in its entirety.

TECHNICAL FIELD

Embodiments of the present invention relates to the field of communications technologies, and in particular, to a spectrum processing method, a base station, user equipment, and a system.

BACKGROUND

With continuous development of communications technologies, operators are gradually replacing Global System for Mobile Communications (GSM) networks with Long Term Evolution (LTE) networks. When an operator deploys an LTE network, a small part of a GSM network spectrum is reserved for some areas with heavy traffic, and the other part of the GSM network spectrum is all allocated to the LTE for use. Generally, a buffer zone is set around a GSM base station, to avoid mutual interference between signals of a GSM system and an LTE system. For example, there is originally a 20 M GSM network spectrum, and currently, 3.6 M is reserved for a GSM cell, 5 M is allocated to the buffer zone, and the remaining 11.4 M is all allocated to an LTE cell for use. To further improve utilization of a network spectrum, the prior art provides the following manner for allocating the buffer zone to the LTE system for use.

In a process that user equipment (UE) accesses an LTE cell, if an LTE spectrum overlaps a GSM spectrum (that is, a buffer zone exists), a base station instructs the UE to detect whether the UE can accept interference from a GSM signal (which is also referred to as an inter-system measurement). If the UE can accept interference from the GSM signal, the base station allows the UE to use a spectrum of the buffer zone.

In a process of implementing the foregoing spectrum processing, it is found that the prior art has at least the following problem: In the prior art, the UE needs to have an inter-system measurement capability, that is, a capability of detecting whether the UE can accept the GSM signal. If the UE does not have the inter-system measurement capability, the spectrum of the buffer zone cannot be used. When the UE has the inter-system measurement capability, in an inter-system measurement process, not only power consumption of the UE is increased, but also sending of a measurement report (an inter-system measurement result) consumes scarce air interface resources of the LTE cell.

SUMMARY

Embodiments of the present invention provide a spectrum processing method, a base station, user equipment, and a system, so as to resolve, when it is determined to use a spectrum of a buffer zone, a problem of dependence on an inter-system measurement capability of UE, or problems that power consumed by UE having an inter-system measurement function to perform an inter-system measurement is high and sending of a measurement report consumes an air interface resource.

According to a first aspect, an embodiment of the present invention provides a spectrum processing method, where the method includes:

receiving, by a base station corresponding to a first cell, at least one subband channel quality parameter that is sent by user equipment (UE) in the first cell, where each subband channel quality parameter indicates quality of one subband channel; and determining, according to the at least one subband channel quality parameter, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell.

In a first possible implementation manner of the first aspect, the at least one subband channel quality parameter includes at least one first subband channel quality parameter and at least one second subband channel quality parameter, the first subband channel quality parameter corresponds to the overlapped spectrum, the second subband channel quality parameter corresponds to a part of the frequency band of the first cell except the overlapped spectrum, and the determining, according to the received subband channel quality parameter, whether the first cell uses an overlapped spectrum includes:

determining a first average value of the at least one first subband channel quality parameter and a second average value of the at least one second subband channel quality parameter; and determining, according to the first average value and the second average value, whether the first cell uses the overlapped spectrum.

In the first possible implementation manner of the first aspect, a second possible implementation manner of the first aspect is further provided, where in the second possible implementation manner of the first aspect, the determining, according to the first average value and the second average value, whether the first cell uses the overlapped spectrum includes:

when a difference between the second average value and the first average value is less than a preset threshold, determining that the first cell uses the overlapped spectrum; or when a difference between the second average value and the first average value is greater than a preset threshold, determining that the first cell uses the part of the frequency band of the first cell except the overlapped spectrum; or when a difference between the second average value and the first average value is equal to a preset threshold, determining that the first cell uses the overlapped spectrum or the part of the frequency band of the first cell except the overlapped spectrum.

In a third possible implementation manner of the first aspect, the at least one subband channel quality parameter includes at least one first subband channel quality parameter corresponding to the overlapped spectrum, and the determining, according to the received subband channel quality parameter, whether the first cell uses an overlapped spectrum includes:

determining an average value of the at least one first subband channel quality parameter; and determining, according to the average value, whether the first cell uses the overlapped spectrum.

In the third possible implementation manner of the first aspect, a fourth possible implementation manner of the first aspect is further provided, where in the fourth possible implementation manner of the first aspect, the determining, according to the average value, whether the first cell uses the overlapped spectrum includes:

when the average value is greater than a preset threshold, determining that the first cell uses the overlapped spectrum; or when the average value is less than a preset threshold, determining that the first cell uses a part of the frequency band of the first cell except the overlapped spectrum; or when the average value is equal to a preset threshold, determining that the first cell uses the overlapped spectrum or a part of the frequency band of the first cell except the overlapped spectrum.

In the first aspect or the first, second, third, or fourth possible implementation manner of the first aspect, a fifth possible implementation manner of the first aspect is further provided, where in the fifth possible implementation manner of the first aspect, before the receiving, by a base station corresponding to a first cell, at least one subband channel quality parameter that is sent by user equipment (UE) in the first cell, the method further includes:

sending, by the base station, a configuration message to the UE, where the configuration message is used to configure reporting that is performed by the UE on the at least one subband channel quality parameter.

In the first aspect or the first, second, third, fourth, or fifth possible implementation manner of the first aspect, a sixth possible implementation manner of the first aspect is further provided, where in the sixth possible implementation manner of the first aspect, each subband channel quality parameter includes a subband channel quality indicator.

In the first aspect or the first, second, third, fourth, fifth, or sixth possible implementation manner of the first aspect, a seventh possible implementation manner of the first aspect is further provided, where in the seventh possible implementation manner of the first aspect, the first cell is a Long Term Evolution (LTE) cell, and the second cell is a Universal Mobile Telecommunications System (UMTS) cell or a Global System for Mobile Communications (GSM) cell.

According to a second aspect, an embodiment of the present invention further provides a spectrum processing method, including:

measuring, by user equipment (UE) in a first cell, at least one subband channel, and obtaining at least one subband channel quality parameter according to a measurement result; and reporting the at least one subband channel quality parameter to a base station corresponding to the first cell, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell.

In a first possible implementation manner of the second aspect, before the measuring, by user equipment (UE) in a first cell, at least one subband channel, the method further includes:

receiving, by the UE, a configuration message sent by the base station, where the configuration message is used to configure reporting that is performed by the UE on the at least one subband channel quality parameter, where the reporting the at least one subband channel quality parameter to a base station corresponding to the first cell includes:

reporting the at least one subband channel quality parameter to the base station according to the configuration message.

In the second aspect or the first possible implementation manner of the second aspect, a second possible implementation manner of the second aspect is further provided, where in the second possible implementation manner of the second aspect, each subband channel quality parameter includes a subband channel quality indicator.

In the second aspect or the first or second possible implementation manner of the second aspect, a third possible implementation manner of the second aspect is further provided, where in the third possible implementation manner of the second aspect, the first cell is a Long Term Evolution (LTE) cell, and the second cell is a Universal Mobile Telecommunications System (UMTS) cell or a Global System for Mobile Communications (GSM) cell.

According to a third aspect, an embodiment of the present invention further provides a base station, where the base station corresponds to a first cell, and the base station includes:

a receiving unit, configured to receive at least one subband channel quality parameter that is sent by user equipment (UE) in the first cell, where each subband channel quality parameter indicates quality of one subband channel; and a determining unit, configured to determine, according to the at least one subband channel quality parameter received by the receiving unit, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell.

In a first possible implementation manner of the third aspect, the at least one subband channel quality parameter includes at least one first subband channel quality parameter and at least one second subband channel quality parameter, the first subband channel quality parameter corresponds to the overlapped spectrum, the second subband channel quality parameter corresponds to a part of the frequency band of the first cell except the overlapped spectrum, and the determining unit includes:

a first determining subunit, configured to determine a first average value of the at least one first subband channel quality parameter and a second average value of the at least one second subband channel quality parameter; and a second determining subunit, configured to determine, according to the first average value and the second average value that are determined by the first determining subunit, whether the first cell uses the overlapped spectrum.

In the first possible implementation manner of the third aspect, a second possible implementation manner of the third aspect is further provided, where in the second possible implementation manner of the third aspect, the second determining subunit is specifically configured to:

when a difference between the second average value and the first average value is less than a preset threshold, determine that the first cell uses the overlapped spectrum; or when a difference between the second average value and the first average value is greater than a preset threshold, determine that the first cell uses the part of the frequency band of the first cell except the overlapped spectrum; or when a difference between the second average value and the first average value is equal to a preset threshold, determine that the first cell uses the overlapped spectrum or the part of the frequency band of the first cell except the overlapped spectrum.

In a third possible implementation manner of the third aspect, the at least one subband channel quality parameter includes at least one first subband channel quality parameter corresponding to the overlapped spectrum, and the determining unit includes:

a first determining subunit, configured to determine an average value of the at least one first subband channel quality parameter; and a second determining subunit, configured to determine, according to the average value determined by the first determining subunit, whether the first cell uses the overlapped spectrum.

In the third possible implementation manner of the third aspect, a fourth possible implementation manner of the third aspect is further provided, where in the fourth possible implementation manner of the third aspect, the second determining subunit is specifically configured to:

when the average value is greater than a preset threshold, determine that the first cell uses the overlapped spectrum; or when the average value is less than a preset threshold, determine that the first cell uses a part of the frequency band of the first cell except the overlapped spectrum; or when the average value is equal to a preset threshold, determine that the first cell uses the overlapped spectrum or a part of the frequency band of the first cell except the overlapped spectrum.

In the third aspect or the first, second, third, or fourth possible implementation manner of the third aspect, a fifth possible implementation manner of the third aspect is further provided, where in the fifth possible implementation manner of the third aspect, the base station further includes a sending unit, configured to send a configuration message to the UE, where the configuration message is used to configure reporting that is performed by the UE on the at least one subband channel quality parameter.

In the third aspect or the first, second, third, fourth, or fifth possible implementation manner of the third aspect, a sixth possible implementation manner of the third aspect is further provided, where in the sixth possible implementation manner of the third aspect, each subband channel quality parameter includes a subband channel quality indicator.

In the third aspect or the first, second, third, fourth, fifth, or sixth possible implementation manner of the third aspect, a seventh possible implementation manner of the third aspect is further provided, where in the seventh possible implementation manner of the third aspect, the first cell is a Long Term Evolution (LTE) cell, and the second cell is a Universal Mobile Telecommunications System (UMTS) cell or a Global System for Mobile Communications (GSM) cell.

According to a fourth aspect, an embodiment of the present invention further provides user equipment (UE), where the user equipment is user equipment in a first cell, and the user equipment includes:

a measurement unit, configured to measure at least one subband channel, and obtain at least one subband channel quality parameter according to a measurement result; and a sending unit, configured to report the at least one subband channel quality parameter obtained by the measurement unit to a base station corresponding to the first cell, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell.

In a first possible implementation manner of the fourth aspect, the user equipment further includes:

a receiving unit, configured to receive a configuration message sent by the base station, where the configuration message is used to configure reporting that is performed by the UE on the at least one subband channel quality parameter, where the sending unit is specifically configured to report the at least one subband channel quality parameter to the base station according to the configuration message.

In the fourth aspect or the first possible implementation manner of the fourth aspect, a second possible implementation manner of the fourth aspect is further provided, where in the second possible implementation manner of the fourth aspect, each subband channel quality parameter includes a subband channel quality indicator.

In the fourth aspect or the first or second possible implementation manner of the fourth aspect, a third possible implementation manner of the fourth aspect is further provided, where in the third possible implementation manner of the fourth aspect, the first cell is a Long Term Evolution (LTE) cell, and the second cell is a Universal Mobile Telecommunications System (UMTS) cell or a Global System for Mobile Communications (GSM) cell.

According to a fifth aspect, an embodiment of the present invention further provides a spectrum processing system, where the system includes the base station described in the third aspect and the user equipment described in the fourth aspect.

In the prior art, UE performs an inter-system measurement to determine whether an overlapped spectrum is used. Compared with the prior art, in an embodiment of the present invention, whether a first cell uses an overlapped spectrum is determined according to at least one subband channel quality parameter, and UE does not need to perform an inter-system measurement, thereby reducing power consumption of the UE. In addition, a step of sending a measurement report by the UE is omitted, thereby saving air interface resources.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present disclosure.

Figure 1:
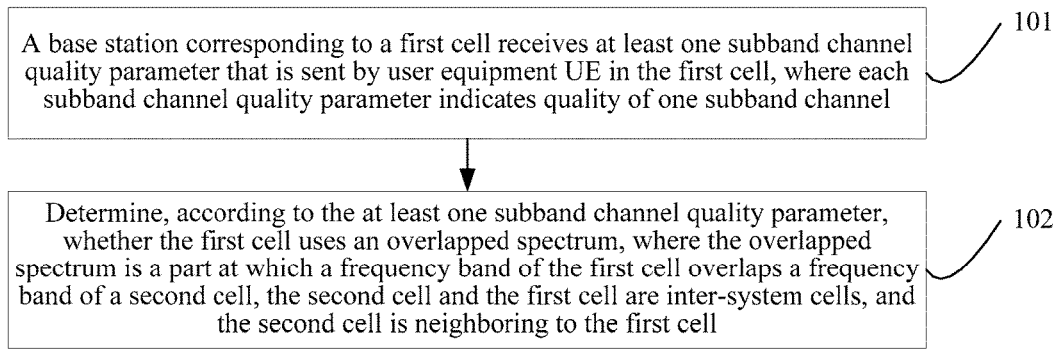
FIG. 1 is a flowchart of a first spectrum processing method according to an embodiment of the present invention.

An embodiment of the present invention provides a spectrum processing method. The method is applied to a base station. As shown in FIG. 1, the method includes:

Step 101: A base station corresponding to a first cell receives at least one subband channel quality parameter that is sent by user equipment (UE) in the first cell, where each subband channel quality parameter indicates quality of one subband channel.

The subband channel is obtained by evenly dividing a channel. For example, a 20 M spectrum is divided into 10 subband channels, where each subband channel is allocated 2 M. After collecting statistics on each subband channel quality parameter, the UE sends at least one subband channel quality parameter to the base station.

Step 102: Determine, according to the at least one subband channel quality parameter, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell.

The base station corresponding to the first cell determines and obtains, according to spectrum planning data stored in the base station, a first average value of a subband channel parameter corresponding to the overlapped spectrum. If the overlapped spectrum corresponds to one subband channel, a subband channel parameter of the subband channel is used as the first average value.

The base station corresponding to the first cell compares the first average value with a threshold, and determines whether the first cell uses the overlapped spectrum according to a comparison result. Alternatively, the base station corresponding to the first cell obtains a second average value of a subband channel parameter corresponding to another spectrum except the overlapped spectrum, and compares the first average value with the second average value, and determines whether the first cell uses the overlapped spectrum according to a comparison result.

It should be noted that the first cell is a Long Term Evolution (LTE) cell, and the second cell is a Universal Mobile Telecommunications System (UMTS) cell or a Global System for Mobile Communications (GSM) cell.

In the spectrum processing method provided in the embodiment of the present invention, a base station corresponding to a first cell receives at least one subband channel quality parameter that is sent by UE in the first cell, where each subband channel quality parameter indicates quality of one subband channel; and determines, according to the at least one subband channel quality parameter, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell. Compared with a method in the prior art, in which whether an overlapped spectrum is used is determined according to an inter-system measurement performed by UE, in the present invention, whether a first cell uses an overlapped spectrum is determined according to at least one subband channel quality parameter, and the UE does not need to perform an inter-system measurement, thereby reducing power consumption of the UE. In addition, a step of sending a measurement report by the UE is omitted, thereby saving air interface resources.

Figure 2:
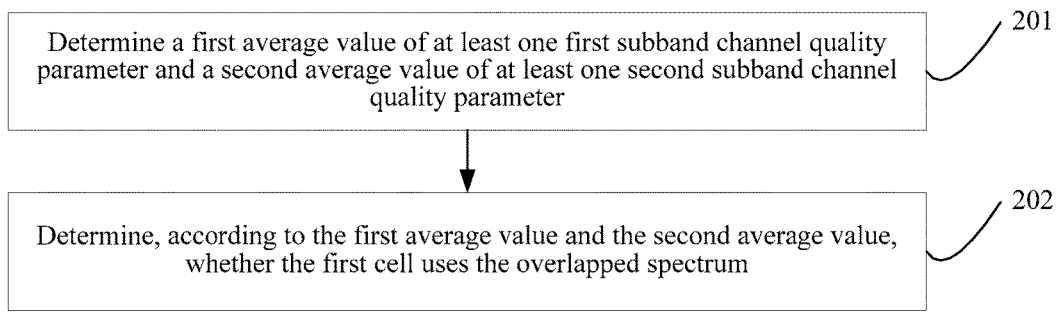
FIG. 2 is a flowchart of a second spectrum processing method according to an embodiment of the present invention.

An embodiment of the present invention further provides a spectrum processing method, to specifically describe the method shown in FIG. 1. The at least one subband channel quality parameter includes at least one first subband channel quality parameter and at least one second subband channel quality parameter, the first subband channel quality parameter corresponds to the overlapped spectrum, the second subband channel quality parameter corresponds to a part of the frequency band of the first cell except the overlapped spectrum, and as shown in FIG. 2, step 102 of determining, according to the received subband channel quality parameter, whether the first cell uses an overlapped spectrum includes:

Step 201: Determine a first average value of the at least one first subband channel quality parameter and a second average value of the at least one second subband channel quality parameter.

If only one first subband channel quality parameter exists, the first subband channel quality parameter is the first average value. Similarly, if only one second subband channel quality parameter exists, the second subband channel quality parameter is the second average value.

Step 202: Determine, according to the first average value and the second average value, whether the first cell uses the overlapped spectrum.

Whether the first cell uses the overlapped spectrum is determined according to a difference between the first average value and the second average value, which specifically includes:

1. When the difference between the second average value and the first average value is less than a preset threshold, determine that the first cell uses the overlapped spectrum.

When the difference between the second average value and the first average value is less than the preset threshold, it indicates that channel quality of the overlapped spectrum slightly differs from channel quality of the part, used by the first cell, of the frequency band of the first cell except the overlapped spectrum, and the difference does not exceed the preset threshold. Therefore, the overlapped spectrum can be used for communication.

2. When the difference between the second average value and the first average value is greater than a preset threshold, determine that the first cell uses the part of the frequency band of the first cell except the overlapped spectrum.

When the difference between the second average value and the first average value is greater than the preset threshold, it indicates that channel quality of the overlapped spectrum greatly differs from channel quality of the part, used by the first cell, of the frequency band of the first cell except the overlapped spectrum, the difference exceeds the preset threshold, and the channel quality of the overlapped spectrum is far lower than the channel quality of the part, used by the first cell, of the frequency band of the first cell except the overlapped spectrum. Therefore, the first cell uses the part of the frequency band of the first cell except the overlapped spectrum.

3. When the difference between the second average value and the first average value is equal to a preset threshold, determine that the first cell uses the overlapped spectrum or the part of the frequency band of the first cell except the overlapped spectrum.

When the difference between the second average value and the first average value is equal to the preset threshold, it indicates that a difference between channel quality of the overlapped spectrum and channel quality of the part, used by the first cell, of the frequency band of the first cell except the overlapped spectrum is a critical value. Therefore, the first cell not only may use the overlapped spectrum, but also may use the part of the frequency band of the first cell except the overlapped spectrum. Settings are specifically performed according to an actual requirement, and are not limited herein in this embodiment of the present invention.

According to the spectrum processing method provided in this embodiment of the present invention, a first average value indicating channel quality of an overlapped spectrum, and a second average value indicating channel quality of a part of a frequency band of a first cell except the overlapped spectrum can be separately calculated according to subband channel quality parameters, and whether the first cell uses the overlapped spectrum is determined by determining whether a difference between the first average value and the second average value is greater than a preset threshold. The first average value and the second average value can reflect real-time channel quality, thereby improving real-time performance of spectrum processing.

Figure 3:
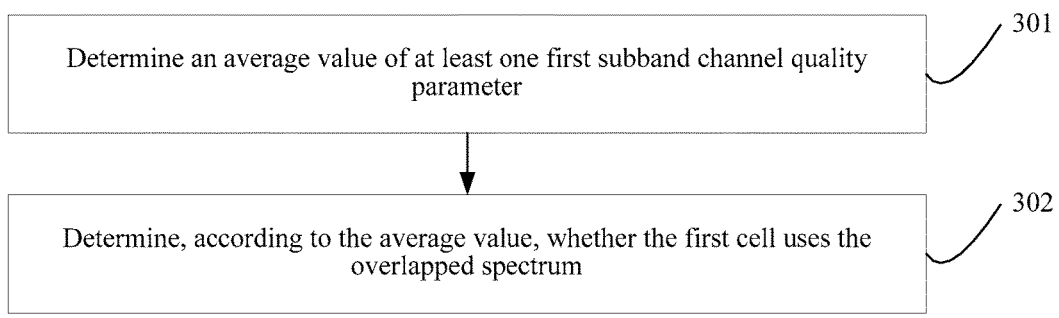
FIG. 3 is a flowchart of a third spectrum processing method according to an embodiment of the present invention.

An embodiment of the present invention further provides a spectrum processing method, to specifically describe the method shown in FIG. 1. The at least one subband channel quality parameter includes at least one first subband channel quality parameter corresponding to the overlapped spectrum. As shown in FIG. 3, step 102 of determining, according to the received subband channel quality parameter, whether the first cell uses an overlapped spectrum includes:

Step 301: Determine an average value of the at least one first subband channel quality parameter.

Step 302: Determine, according to the average value, whether the first cell uses the overlapped spectrum.

Whether the first cell uses the overlapped spectrum is determined according to a difference between the average value and a preset threshold, which specifically includes:

1. When the average value is greater than the preset threshold, determine that the first cell uses the overlapped spectrum.

When the average value is greater than the preset threshold, it indicates that channel quality of the overlapped spectrum is higher than preset channel quality, and the overlapped spectrum can be used for communication.

2. When the average value is less than the preset threshold, determine that the first cell uses a part of the frequency band of the first cell except the overlapped spectrum.

When the average value is less than the preset threshold, it indicates that channel quality of the overlapped spectrum is lower than preset channel quality, and the first cell uses a part of the frequency band of the first cell except the overlapped spectrum.

3. When the average value is equal to the preset threshold, determine that the first cell uses the overlapped spectrum or a part of the frequency band of the first cell except the overlapped spectrum.

When the average value is equal to the preset threshold, it indicates that channel quality of the overlapped spectrum is equal to preset channel quality, and the first cell not only may use the overlapped spectrum, but also may use a part of the frequency band of the first cell except the overlapped spectrum. Settings are specifically performed according to an actual requirement, and are not limited herein in this embodiment of the present invention.

According to the spectrum processing method provided in this embodiment of the present invention, an average value indicating channel quality of an overlapped spectrum can be calculated according to a subband channel quality parameter, and whether a first cell uses the overlapped spectrum is determined by comparing the average value with a preset threshold.

Figure 4:
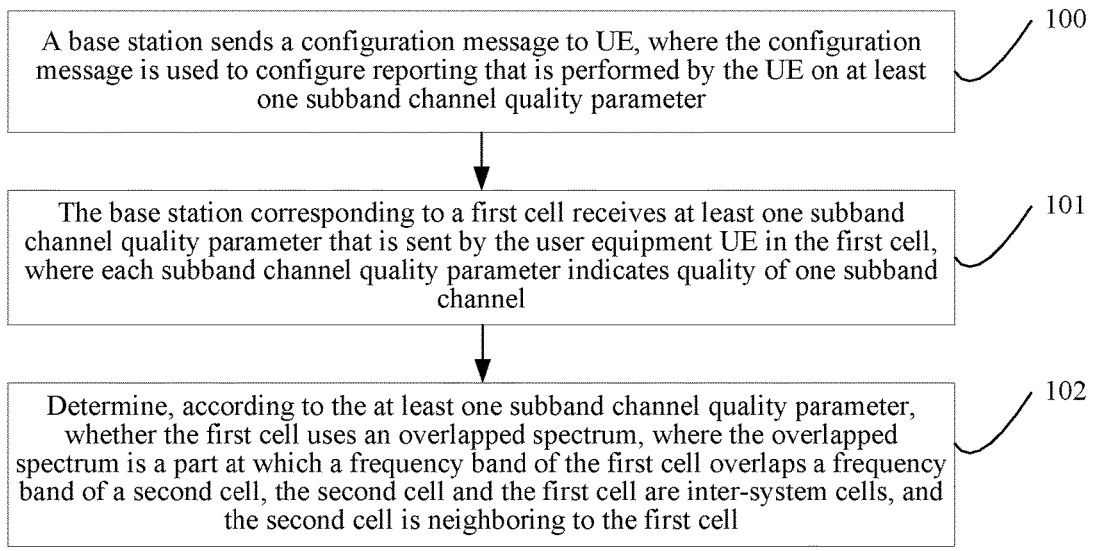
FIG. 4 is a flowchart of a fourth spectrum processing method according to an embodiment of the present invention.

An embodiment of the present invention further provides a spectrum processing method, to further describe the method shown in FIG. 1. As shown in FIG. 4, before step 101 of receiving, by a base station corresponding to a first cell, at least one subband channel quality parameter that is sent by user equipment (UE) in the first cell, the method further includes:

Step 100: The base station sends a configuration message to the UE, where the configuration message is used to configure reporting that is performed by the UE on the at least one subband channel quality parameter.

According to the spectrum processing method provided in this embodiment of the present invention, the configuration message is sent to the user equipment, so that the user equipment reports the at least one subband channel quality parameter according to the configuration message. For example, the base station sends a Radio Resource Control (RRC) reconfiguration message to the UE through an air interface, to configure reporting on the subband channel quality parameter, where a configured parameter may include a reporting period, a reporting form, and the like, which is not limited in this embodiment of the present invention.

Further, each subband channel quality parameter may be a subband channel quality indicator. The subband channel quality parameter is quantized by using the subband channel quality indicator, thereby improving accuracy of spectrum processing.

A further description is provided below by using a usage scenario:

As shown in Table 1, an entire channel spectrum is 0 M to 20 M, a subband channel has a bandwidth of 2 M, and the entire channel spectrum is divided into 10 subband channels. If the overlapped spectrum occupies a spectrum of 0 M to 5 M, three subband channels corresponds to the overlapped spectrum, where the three subband channels are 0 M to 2 M, 2 M to 4 M, and 4 M to 6 M. After receiving 10 subband channel quality parameters sent by UE, a base station finds subband channel quality parameters, which respectively correspond to the three frequency bands, 0 M to 2 M, 2 M to 4 M, and 4 M to 6 M, from the 10 subband channel quality parameters. As shown in Table 1, a subband channel quality parameter of 0 M to 2 M is 6, a subband channel quality parameter of 2 M to 4 M is 6, and a subband channel quality parameter of 4 M to 6 M is 3. An average value of the three subband channel quality parameters is calculated, that is, (6+6+3)/3=5. If a preset threshold is 4, because 5 is greater than 4, it is determined that the overlapped spectrum is used. An average value of the remaining seven subband channel quality parameters is calculated, that is, (6+7+8+8+8+7+6)/7=50/7≈7.1. Because the first average value of subband channel quality parameters corresponding to the overlapped spectrum is 5, a difference between the second average value and the first average value is 7.1−5≈2. If a preset threshold is 3, because 2<3, that is, the difference between the second average value and the first average value is less than the preset threshold, it is determined that the first cell uses the overlapped spectrum.

TABLE 1

| Frequency band range | Subband channel quality parameter |
|---|---|
| 0-2 | 6 |
| 2-4 | 6 |
| 4-6 | 3 |
| 6-8 | 6 |
| 8-10 | 7 |
| 10-12 | 8 |
| 12-14 | 8 |
| 14-16 | 8 |
| 16-18 | 7 |
| 18-20 | 6 |

Figure 5:
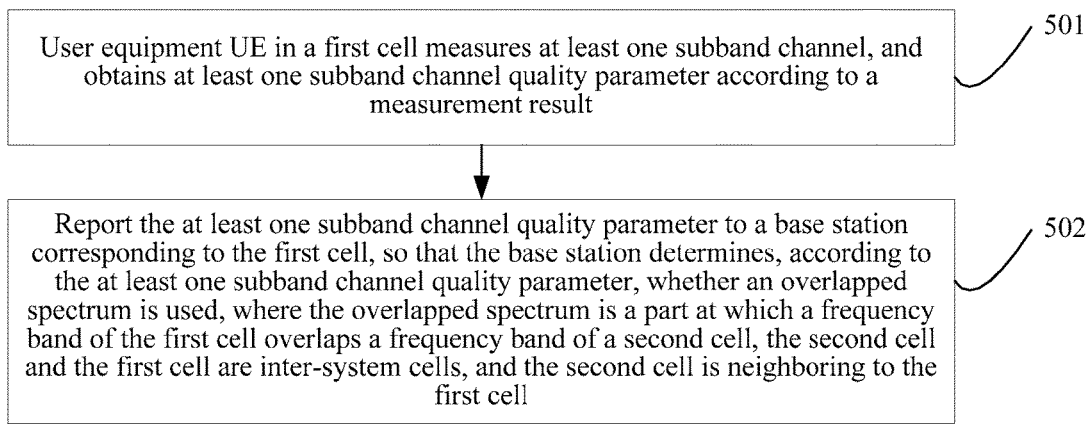
FIG. 5 is a flowchart of a fifth spectrum processing method according to an embodiment of the present invention.

An embodiment of the present invention further provides a spectrum processing method. The method is applied to user equipment in a first cell. As shown in FIG. 5, the method includes:

Step 501: A UE in a first cell measures at least one subband channel, and obtains at least one subband channel quality parameter according to a measurement result.

Step 502: Report the at least one subband channel quality parameter to a base station corresponding to the first cell, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell.

According to the spectrum processing method provided in this embodiment of the present invention, the user equipment can measure at least one subband channel, and obtain at least one subband channel quality parameter according to a measurement result; and report the at least one subband channel quality parameter to a base station corresponding to a first cell, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell. In the prior art, the user equipment needs to perform an inter-system measurement, and send a measurement result to a server corresponding to the first cell. In the embodiment of the present invention, the user equipment reports the at least one subband channel quality parameter to the base station of the first cell, so that the base station determines whether the overlapped spectrum is used, thereby reducing device complexity of the user equipment.

Figure 6:
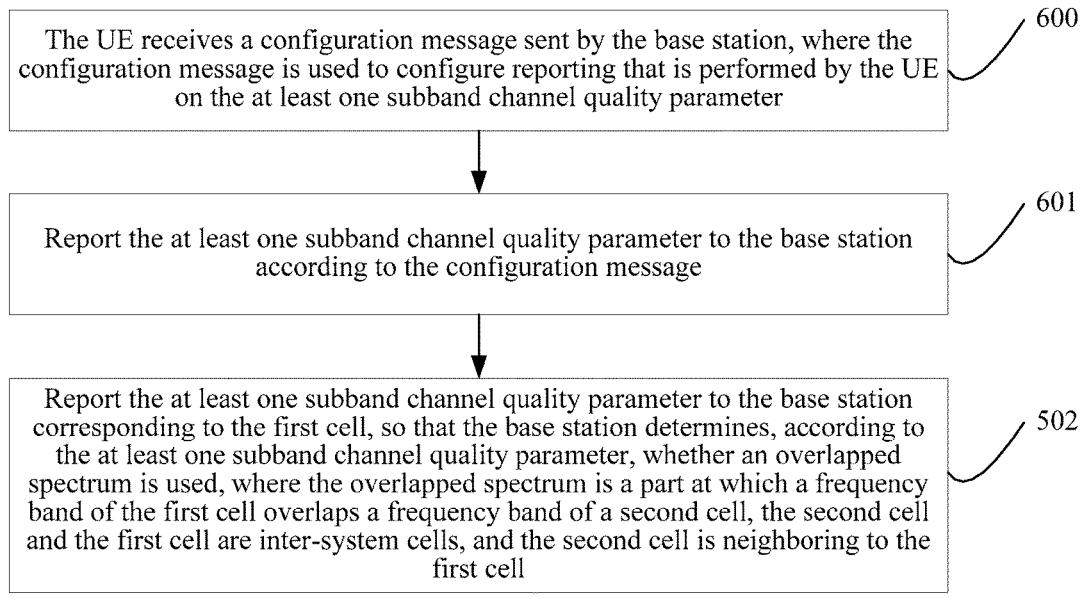
FIG. 6 is a flowchart of a sixth spectrum processing method according to an embodiment of the present invention.

An embodiment of the present invention further provides a spectrum processing method, to further describe the method shown in FIG. 5. As shown in FIG. 6, before step 501 of measuring, by the UE in a first cell, at least one subband channel, the method further includes:

Step 600: The UE receives a configuration message sent by the base station, where the configuration message is used to configure reporting that is performed by the UE on the at least one subband channel quality parameter.

Step 502 of reporting the at least one subband channel quality parameter to a base station corresponding to the first cell includes:

Step 601: Report the at least one subband channel quality parameter to the base station according to the configuration message.

According to the spectrum processing method provided in this embodiment of the present invention, user equipment can receive a configuration message sent by a base station, and because the configuration message can be flexibly set, subband channel parameters of different bandwidths and different frequency bands can be obtained according to the configuration message, which improves flexibility of spectrum processing.

Further, each subband channel quality parameter may be a subband channel quality indicator. Because the channel quality indicator (CQI) is existing signaling, signaling overheads can be reduced.

Furthermore, the first cell is an LTE cell, and the second cell is a Universal Mobile Telecommunications System (UMTS) cell or a Global System for Mobile Communications (GSM) cell.

Figure 7:
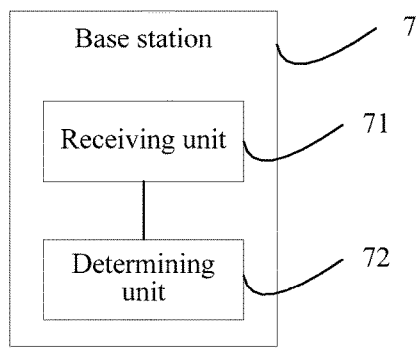
FIG. 7 is a schematic structural diagram of a first base station according to an embodiment of the present invention.

An embodiment of the present invention further provides a base station 7, where the base station 7 corresponds to a first cell. As shown in FIG. 7, the base station 7 includes:

a receiving unit 71, configured to receive at least one subband channel quality parameter that is sent by a UE in the first cell, where each subband channel quality parameter indicates quality of one subband channel; and a determining unit 72, configured to determine, according to the at least one subband channel quality parameter received by the receiving unit 71, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell.

Figure 8:
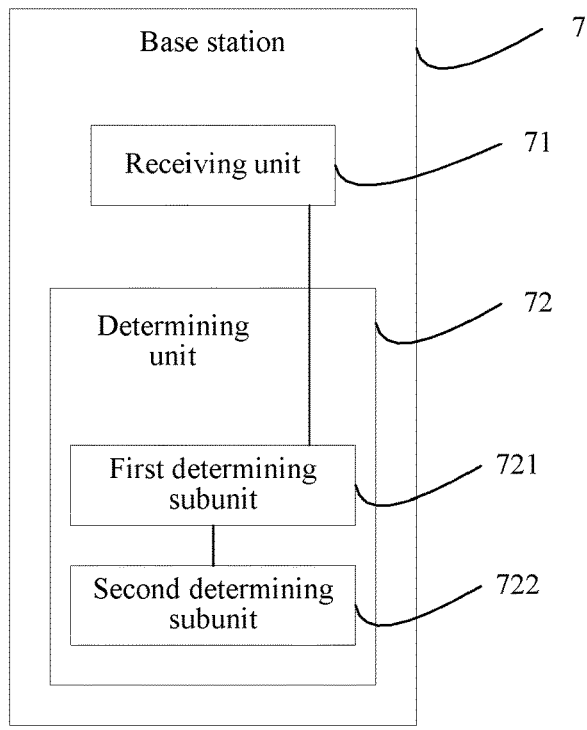
FIG. 8 is a schematic structural diagram of a second base station according to an embodiment of the present invention.

Embodiments of the present invention further provide a base station 7, to describe the base station 7 shown in FIG. 7. The at least one subband channel quality parameter includes at least one first subband channel quality parameter and at least one second subband channel quality parameter, the first subband channel quality parameter corresponds to the overlapped spectrum, the second subband channel quality parameter corresponds to a part of the frequency band of the first cell except the overlapped spectrum, and as shown in FIG. 8. The determining unit 72 includes:

a first determining subunit 721, configured to determine a first average value of the at least one first subband channel quality parameter and a second average value of the at least one second subband channel quality parameter; and a second determining subunit 722, configured to determine, according to the first average value and the second average value that are determined by the first determining subunit 721, whether the first cell uses the overlapped spectrum.

The present invention further provides a base station 7, to specifically describe the base station 7 shown in FIG. 8. The second determining subunit 722 is configured to:

when a difference between the second average value and the first average value is less than a preset threshold, determine that the first cell uses the overlapped spectrum; or when a difference between the second average value and the first average value is greater than a preset threshold, determine that the first cell uses the part of the frequency band of the first cell except the overlapped spectrum; or when a difference between the second average value and the first average value is equal to a preset threshold, determine that the first cell uses the overlapped spectrum or the part of the frequency band of the first cell except the overlapped spectrum.

Embodiments of the present invention further provide a base station 7, to specifically describe the base station 7 shown in FIG. 7. The at least one subband channel quality parameter includes at least one first subband channel quality parameter corresponding to the overlapped spectrum, and as shown in FIG. 9, the determining unit 72 includes:

a first determining subunit 723, configured to determine an average value of the at least one first subband channel quality parameter; and a second determining subunit 724, configured to determine, according to the average value determined by the first determining subunit 723, whether the first cell uses the overlapped spectrum.

Figure 9:
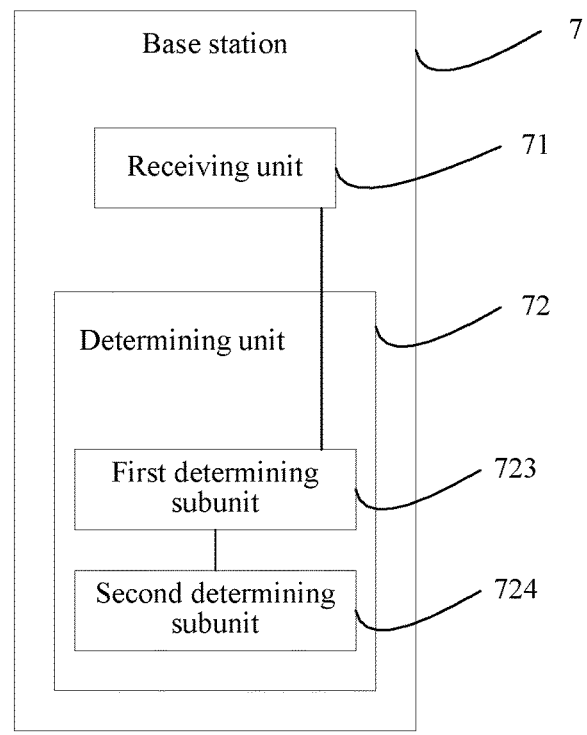
FIG. 9 is a schematic structural diagram of a third base station according to an embodiment of the present invention.

Embodiments of the present invention further provide a base station 7, to specifically describe the base station 7 shown in FIG. 9. The second determining subunit 724 is configured to:

when the average value is greater than a preset threshold, determine that the first cell uses the overlapped spectrum; or when the average value is less than a preset threshold, determine that the first cell uses a part of the frequency band of the first cell except the overlapped spectrum; or when the average value is equal to a preset threshold, determine that the first cell uses the overlapped spectrum or a part of the frequency band of the first cell except the overlapped spectrum.

Figure 10:
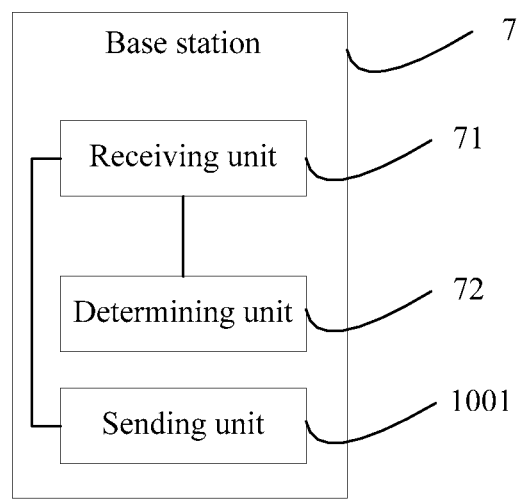
FIG. 10 is a schematic structural diagram of a fourth base station according to an embodiment of the present invention.

Embodiments of the present invention further provide a base station 7, to further describe the base station 7 shown in FIG. 7. As shown in FIG. 10, the base station 7 further includes a sending unit 1001, configured to send a configuration message to the UE, where the configuration message is used to configure reporting that is performed by the UE on the at least one subband channel quality parameter.

Furthermore, each subband channel quality parameter includes a subband channel quality indicator.

Furthermore, the first cell is an LTE cell, and the second cell is a UMTS cell or a GSM cell.

In this embodiment of the present invention, the receiving unit may be a receiver of the base station 7, and the sending unit may be a transmitter of the base station 7. In addition, the receiving unit and the sending unit may be integrated together to form a transceiver of the base station 7. The determining unit may be an independently disposed processor, or may be integrated in a processor of the base station 7 for implementation. In addition, the determining unit may be stored in a memory of the base station 7 in a form of program code, and the program code is invoked by a processor of the base station 7 to perform functions of the determining unit. The processor herein may be a central processing unit (CPU) or an application specific integrated circuit (ASIC), or may be configured into one or more integrated circuits for implementing the embodiments of the present invention.

Figure 11:
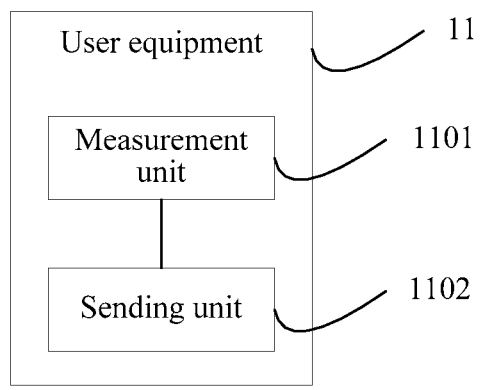
FIG. 11 is a schematic structural diagram of first user equipment according to an embodiment of the present invention.

An embodiment of the present invention provides a user equipment 11, where the user equipment 11 is user equipment 11 in a first cell. As shown in FIG. 11, the user equipment 11 includes:

a measurement unit 1101, configured to measure at least one subband channel, and obtain at least one subband channel quality parameter according to a measurement result; and a sending unit 1102, configured to report the at least one subband channel quality parameter obtained by the measurement unit 1101 to a base station corresponding to the first cell, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell.

Figure 12:
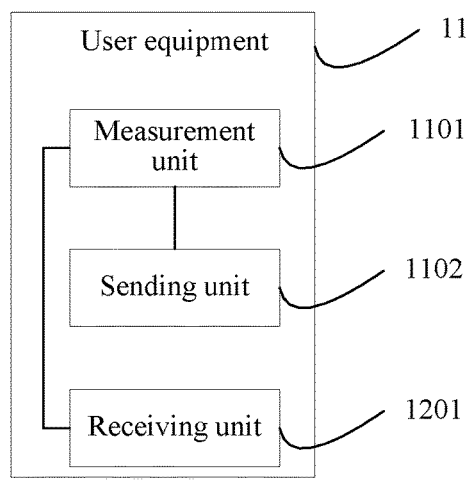
FIG. 12 is a schematic structural diagram of second user equipment according to an embodiment of the present invention.

An embodiment of the present invention further provides user equipment 11, to further describe the user equipment 11 shown in FIG. 11. As shown in FIG. 12, the user equipment 11 further includes:

a receiving unit 1201, configured to receive a configuration message sent by the base station, where the configuration message is used to configure reporting that is performed by the UE on the at least one subband channel quality parameter, where the sending unit 1102 is configured to: report the at least one subband channel quality parameter to the base station according to the configuration message.

Furthermore, each subband channel quality parameter includes a subband channel quality indicator.

Furthermore, the first cell is an LTE cell, and the second cell is a UMTS cell or a GSM cell.

In this embodiment of the present invention, the receiving unit may be a receiver of the user equipment, and the sending unit may be a transmitter of the user equipment. In addition, the receiving unit and the sending unit may be integrated together to form a transceiver of the user equipment. The measurement unit may be an independently disposed measurement circuit, or may be integrated in a processor of the user equipment for implementation. In addition, the measurement unit may be stored in a memory of the user equipment in a form of program code, and the program code is invoked by a processor of the user equipment to perform functions of the measurement unit. The processor herein may be a central processing unit (CPU) or an application specific integrated circuit (ASIC), or may be configured into one or more integrated circuits for implementing the embodiments of the present invention.

Figure 13:
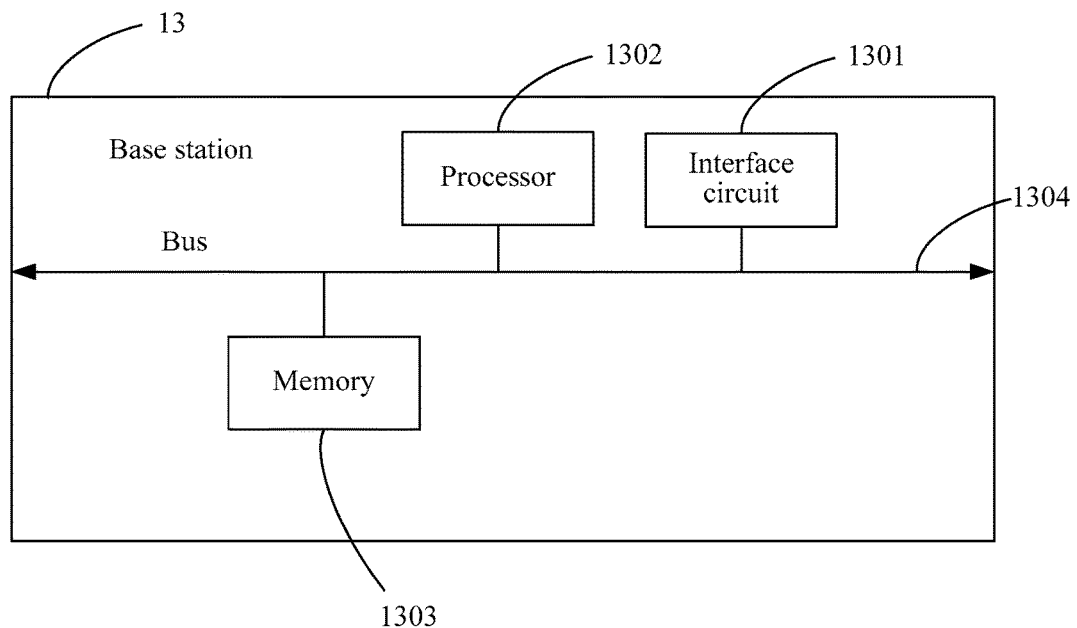
FIG. 13 is a schematic structural diagram of a fifth base station according to an embodiment of the present invention.

An embodiment of the present invention further provides a base station 13, where the base station 13 corresponds to a first cell. As shown in FIG. 13, the base station 13 includes an interface circuit 1301 and a processor 1302. FIG. 13 further shows a memory 1303 and a bus 1304. The processor 1302, the interface circuit 1301, and the memory 1303 are connected to and communicate with each other by using the bus 1304.

The interface circuit 1301 is configured to receive at least one subband channel quality parameter that is sent by a UE in the first cell, where each subband channel quality parameter indicates quality of one subband channel. The interface circuit 1301 may be, for example, a common public radio interface (CPRI), and is configured to connect to a radio frequency part of the base station, and receive, by using an antenna, the at least one subband channel quality parameter sent by the UE.

The processor 1302 is configured to determine, according to the at least one subband channel quality parameter received by the interface circuit 1301, whether the first cell uses an overlapped spectrum, where the overlapped spectrum is a part at which a frequency band of the first cell overlaps a frequency band of a second cell, the second cell and the first cell are inter-system cells, and the second cell is neighboring to the first cell.

It should be noted that the processor 1302 in this embodiment of the present invention may be a processor, or may be a common name of multiple processing components. For example, the processor 1302 may be a CPU or may be an ASIC, or may be configured into one or more integrated circuits for implementing the embodiments of the present invention, such as one or more digital signal processors (DSP) or one or more field programmable gate arrays (FPGA).

The memory 1303 may be a storage apparatus or may be a common name of multiple storage components, and is configured to store executable program code and the like. The memory 1303 may include a random access memory (RAM) or may include a non-volatile memory, such as a magnetic disk storage or a flash memory.

Figure 14:
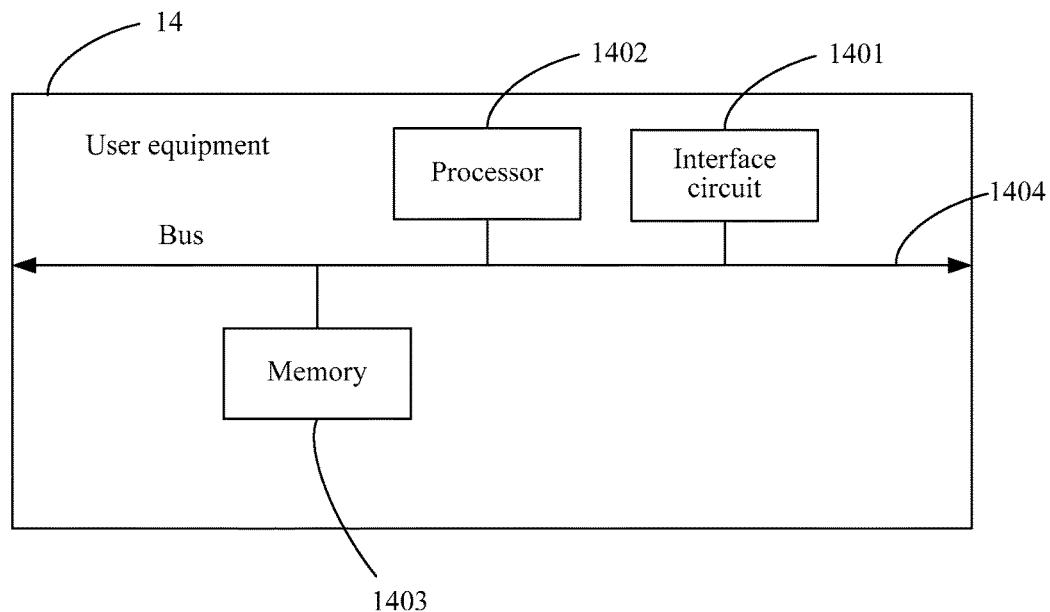
FIG. 14 is a schematic structural diagram of third user equipment according to an embodiment of the present invention.

The bus 1304 may be an industry standard architecture (ISA) bus, a peripheral component interconnect (PCI) bus, an extended industry standard architecture (EISA) bus, or the like. The bus 1304 may be classified into an address bus, a data bus, a control bus, and the like. For ease of representation, the bus in FIG. 14 is represented by using only one bold line, but it does not indicate that there is only one bus or only one type of bus.

Embodiments of the present invention further provide a base station 13, to specifically describe the base station 13 shown in FIG. 13. The at least one subband channel quality parameter includes at least one first subband channel quality parameter and at least one second subband channel quality parameter, the first subband channel quality parameter corresponds to the overlapped spectrum, the second subband channel quality parameter corresponds to a part of the frequency band of the first cell except the overlapped spectrum, and the processor 1302 is configured to:

determine a first average value of the at least one first subband channel quality parameter and a second average value of the at least one second subband channel quality parameter; and determine, according to the first average value and the second average value, whether the first cell uses the overlapped spectrum.

Embodiments of the present invention further provide a base station 13, to specifically describe the base station 13 shown in FIG. 13. The processor 1302 is further configured to:

when a difference between the second average value and the first average value is less than a preset threshold, determine that the first cell uses the overlapped spectrum; or when a difference between the second average value and the first average value is greater than a preset threshold, determine that the first cell uses the part of the frequency band of the first cell except the overlapped spectrum; or when a difference between the second average value and the first average value is equal to a preset threshold, determine that the first cell uses the overlapped spectrum or the part of the frequency band of the first cell except the overlapped spectrum.

Embodiments of the present invention further provide a base station 13, to specifically describe the base station 13 shown in FIG. 13. The at least one subband channel quality parameter includes at least one first subband channel quality parameter corresponding to the overlapped spectrum, and the processor 1302 being configured to determine, according to the at least one subband channel quality parameter received by the interface circuit 1301, whether the first cell uses an overlapped spectrum includes:

the processor 1302 being configured to determine an average value of the at least one first subband channel quality parameter; and determine, according to the average value, whether the first cell uses the overlapped spectrum.

Embodiments of the present invention further provide a base station 13, to specifically describe the base station 13 shown in FIG. 13. The processor 1302 is further configured to:

when the average value is greater than a preset threshold, determine that the first cell uses the overlapped spectrum; or when the average value is less than a preset threshold, determine that the first cell uses a part of the frequency band of the first cell except the overlapped spectrum; or when the average value is equal to a preset threshold, determine that the first cell uses the overlapped spectrum or a part of the frequency band of the first cell except the overlapped spectrum.

Embodiments of the present invention further provide a base station 13, to further describe the base station 13 shown in FIG. 13. The base station 13 may further send a configuration message to the UE by using the interface circuit 1301, where the configuration message is used to configure reporting that is performed by the UE on the at least one subband channel quality parameter.

An embodiment of the present invention further provides a user equipment 14, where the user equipment 14 is user equipment 14 in a first cell. As shown in FIG. 14, the user equipment 14 includes an interface circuit 1401 and a processor 1402. FIG. 14 further shows a memory 1403 and a bus 1404. The processor 1402, the interface circuit 1401, and the memory 1403 are connected to and communicate with each other by using the bus 1404.

The processor 1402 is configured to measure at least one subband channel, and obtain at least one subband channel quality parameter according to a measurement result; transmit the obtained at least one subband channel quality parameter to an antenna of the user equipment 14 by using the interface circuit 1401, to send the obtained at least one subband channel quality parameter to a base station by using the antenna, so that the base station determines, according to the at least one subband channel quality parameter, whether an overlapped spectrum is used, where the overlapped spectrum is a part at which a frequency band of the first cell overlaps a frequency band of a second cell, the second cell and the first cell are inter-system cells, and the second cell is neighboring to the first cell.

It should be noted that the processor 1402 in this embodiment of the present invention may be a processor or may be a common name of multiple processing components. For example, the processor 1402 may be a CPU or may be an ASIC, or may be configured into one or more integrated circuits for implementing the embodiments of the present invention, such as one or more DSPs or one or more FPGAs.

The memory 1403 may be a storage apparatus or may be a common name of multiple storage components, and is configured to store executable program code and the like. The memory 1403 may include a RAM or may include a non-volatile memory, such as a magnetic disk storage or a flash memory.

The bus 1404 may be an ISA bus, a PCI bus, an EISA bus, or the like. The bus 1404 may be classified into an address bus, a data bus, a control bus, and the like. For ease of representation, the bus in FIG. 14 is represented by using only one bold line, but it does not indicate that there is only one bus or only one type of bus.

Figure 15:
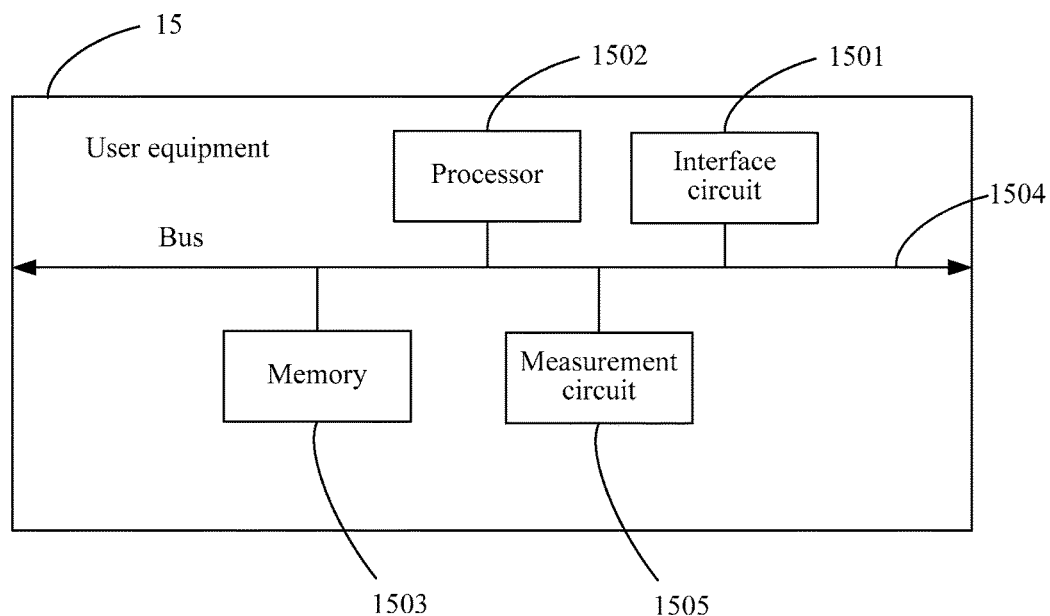
FIG. 15 is a schematic structural diagram of fourth user equipment according to an embodiment of the present invention.

Referring to FIG. 15, in another implementation manner, user equipment 15 may include a measurement circuit 1505, an interface circuit 1501, a processor 1502, a memory 1503, and a bus 1504, and the measurement circuit 1505, the processor 1502, the interface circuit 1501, and the memory 1503 are connected to and communicate with each other by using the bus 1504.

A difference from the UE shown in FIG. 14 is that measurement on each subband channel is implemented by using the measurement circuit 1505, and then the processor 1502 processes a measurement result, to obtain at least one subband channel quality parameter. An embodiment of the present invention further provides user equipment, to further describe the user equipment shown in FIG. 14 or FIG. 15. The interface circuit 1401 or 1501 transmits, to the processor 1402 or 1502, the configuration message that is sent by the base station and that is received by the antenna of the UE, where the configuration message is used to configure reporting that is performed by the UE on the at least one subband channel quality parameter; and the processor 1402 or 1502 is configured to report the at least one subband channel quality parameter to the base station according to the configuration message. Specifically, the reported subband channel quality parameter may be transmitted to the antenna of the UE by using the interface circuit 1401 or 1501, and then reported to the base station. A reporting period and the like may be controlled by the processor 1402 or 1502 according to the configuration message.

Furthermore, each subband channel quality parameter includes a subband channel quality indicator.

Further, the first cell is an LTE cell, and the second cell is a UMTS cell or a GSM cell.

An embodiment of the present invention further provides a spectrum processing system, where the system includes the base station described in any one of the foregoing embodiments and the user equipment described in any one of the foregoing embodiments.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

The foregoing descriptions are merely specific implementation manners of embodiments of the present invention, but are not intended to limit the protection scope of the present disclosure. Any variation or replacement readily figured out by a person skilled in the art within the technical scope disclosed by the embodiments of the present invention shall fall within the protection scope of the present disclosure. Therefore, the protection scope of the present disclosure shall be subject to the protection scope of the claims.

What is claimed is:

1. A spectrum processing method comprising:
receiving, by a base station associated with a first cell, subband channel quality parameters from a user equipment (UE) in the first cell, wherein each subband channel quality parameter indicates a quality of one subband channel and the subband channel quality parameters comprise
   a) at least one first subband channel quality parameter associated with a part of a frequency band of the first cell overlapping a part of a frequency band of a second cell, and
   b) at least one second subband channel quality parameter associated with another part of the frequency band of the first cell that does not overlap with any part of the frequency band of the second cell; and
determining, according to the subband channel quality parameters, whether the first cell uses an overlapped spectrum comprising the frequency band of the first cell that overlaps the frequency band of the second cell, including,
   a) determining a first average value of the at least one first subband channel quality parameter and a second average value of the at least one second subband channel quality parameter; and
   b) determining, according to the first and second average values, whether the first cell uses the overlapped spectrum, such that when a difference between the second and first average values is:
      i. less than a preset threshold, the first cell uses the overlapped spectrum; or
      ii. greater than the preset threshold, the first cell uses the part of the frequency band of the first cell that does not include the overlapped spectrum; or
      iii. equal to the preset threshold, the first cell uses the overlapped spectrum or the part of the frequency band of the first cell except the overlapped spectrum,
wherein the first and second cells are inter-system cells, and the second cell is neighboring to the first cell.

2. The method according to claim 1, wherein before receiving the subband channel quality parameters, the method further comprises:
sending, by the base station, a configuration message to the UE, wherein the configuration message is used to configure reporting performed by the UE on the at least one subband channel quality parameter.

3. The method according to claim 1, wherein each subband channel quality parameter comprises a subband channel quality indicator.

4. The method according to claim 1, wherein the first cell is a Long Term Evolution (LTE) cell, and the second cell is a Universal Mobile Telecommunications System (UMTS) cell or a Global System for Mobile Communications (GSM) cell.

5. A base station associated with a first cell, the base station comprising a processor and a non-transitory computer readable storage medium storing a program, and when the program is executed by the processor, the following operations are performed:
receiving subband channel quality parameters from user equipment (UE) in the first cell, wherein each subband channel quality parameter indicates a quality of one subband channel and the subband channel quality parameters comprise a) at least one first subband channel quality parameter associated with a part of a frequency band of the first cell overlapping a part of a frequency band of a second cell, and
b) at least one second subband channel quality parameter associated with another part of the frequency band of the first cell that does not overlap with any part of the frequency band of the second cell; and determining, according to the subband channel quality parameter, whether the first cell uses an overlapped spectrum comprising the frequency band of the first cell that overlaps the frequency band of the second cell, including,
a) determining a first average value of the at least one first subband channel quality parameter and a second average value of the at least one second subband channel quality parameter; and
b) determining, according to the first and second average values, whether the first cell uses the overlapped spectrum, such that when a difference between the second and first average values is:
   i. less than a preset threshold, the first cell uses the overlapped spectrum; or
   ii. greater than the preset threshold, the first cell uses the part of the frequency band of the first cell that does not include the overlapped spectrum; or
   iii. equal to the preset threshold, the first cell uses the overlapped spectrum or the part of the frequency band of the first cell except the overlapped spectrum, wherein the first and second cells are inter-system cells, and the second cell is neighboring to the first cell.

6. The base station according to claim 5, wherein the base station further comprises a program for sending a configuration message to the UE, wherein the configuration message is used to configure reporting performed by the UE on the at least one subband channel quality parameter.

7. The base station according to claim 5, wherein each subband channel quality parameter comprises a subband channel quality indicator.

8. The base station according to claim 5, wherein the first cell is a Long Term Evolution (LTE) cell, and the second cell is a Universal Mobile Telecommunications System (UMTS) cell or a Global System for Mobile Communications (GSM) cell.

9. A user equipment (UE) in a first cell, the UE comprising a processor and a non-transitory computer readable storage medium, wherein the non-transitory computer readable storage medium stores a program executed by the processor causing the following operations to be performed:

measuring at least one subband channel, and obtaining subband channel quality parameters according to a measurement result and the subband channel quality parameters comprise a) at least one first subband channel quality parameter associated with a part of a frequency band of the first cell overlapping a part of a frequency band of a second cell, and
b) at least one second subband channel quality parameter associated with another part of the frequency band of the first cell that does not overlap with any part of the frequency band of the second cell; and reporting the subband channel quality parameters to a base station corresponding to the first cell, thereby enabling the base station to determine according to the subband channel quality parameters whether the first cell uses an overlapped spectrum comprising the frequency band of the first cell that overlaps the frequency band of the second cell, where the determination by the base station includes
a) determining a first average value of the at least one first subband channel quality parameter and a second average value of the at least one second subband channel quality parameter; and
b) determining, according to the first and second average values, whether the first cell uses the overlapped spectrum, such that when a difference between the second and first average values is:
   i. less than a preset threshold, the first cell uses the overlapped spectrum; or
   ii. greater than the preset threshold, the first cell uses the part of the frequency band of the first cell that does not include the overlapped spectrum; or
   iii. equal to the preset threshold, the first cell uses the overlapped spectrum or the part of the frequency band of the first cell except the overlapped spectrum, wherein the second cell and the first cell are inter-system cells, and the second cell is neighboring to the first cell.

10. The UE according to claim 9, further comprising a program for:
receiving a configuration message sent by the base station, wherein the configuration message is used to configure reporting performed by the UE on the subband channel quality parameters; and
reporting the subband channel quality parameters to the base station according to the configuration message.

11. The UE according to claim 9, wherein each subband channel quality parameter comprises a subband channel quality indicator.

12. The UE according to claim 9, wherein the first cell is a Long Term Evolution (LTE) cell, and the second cell is a Universal Mobile Telecommunications System (UMTS) cell or a Global System for Mobile Communications (GSM) cell.

* * * * *